Figure 1:
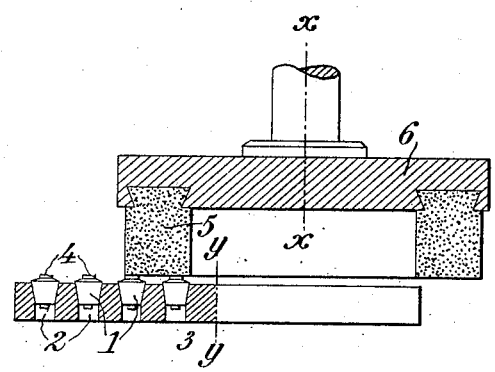

B. W. FJELLMAN.
METHOD OF AND MEANS FOR MANUFACTURING CONICAL ROLLERS OF EXACT DIMENSIONS.
APPLICATION FILED JULY 27, 1916.

1,380,370.

Patented June 7, 1921.

2 SHEETS—SHEET 1.

WITNESSES:

INVENTOR
Bengt Wiktor Fjellman
By Attorneys,

B. W. FJELLMAN.
METHOD OF AND MEANS FOR MANUFACTURING CONICAL ROLLERS OF EXACT DIMENSIONS.
APPLICATION FILED JULY 27, 1916.

1,380,370.

Patented June 7, 1921.

2 SHEETS—SHEET 2.

WITNESSES:
René Pruine
T. J. Wallace

INVENTOR:
Bengt Wiktor Fjellman
By Attorneys,
Fraser, Turk & Myers

UNITED STATES PATENT OFFICE.

BENGT WIKTOR FJELLMAN, OF GOTTENBORG, SWEDEN, ASSIGNOR TO AKTIEBOLAGET SVENSKA KULLAGERFABRIKEN, OF GOTTENBORG, SWEDEN, A CORPORATION OF SWEDEN.

METHOD OF AND MEANS FOR MANUFACTURING CONICAL ROLLERS OF EXACT DIMENSIONS.

1,380,370.  Specification of Letters Patent.  Patented June 7, 1921.

Application filed July 27, 1916. Serial No. 111,589.

*To all whom it may concern:*

Be it known that I, BENGT WIKTOR FJELLMAN, a subject of the King of Sweden, residing at Gottenborg, in the Kingdom of Sweden, have invented a certain new and useful Method of and Means for Manufacturing Conical Rollers of Exact Dimensions, of which the following is a specification.

This invention relates to an improved method of and means for manufacturing conical rollers, particularly rollers for certain roller bearings in which a high degree of accuracy is required.

The object of the invention is to enable an automatic gaging of the rollers to be performed and to rapidly manufacture, at the same time, a great number of rollers of exact dimensions, the time wasting testing hitherto necessary being eliminated.

The invention consists, chiefly, in first grinding the conical surfaces of the rollers so as to obtain conical rollers having exactly equal top angles, and thereupon grinding the end surfaces of a plurality of rollers at a time, said latter grinding operation being performed by means of a rotary grinding disk, while the rollers are held in positions in which their axes are parallel to the axis of the grinding disk and the apices of their conical surfaces lie all in one plane parallel to the working surface of the grinding disk.

The method is particularly practical in manufacturing rollers for double row roller bearings having, between the two rows of rollers, a distance ring serving to keep the rollers in position axially and to take up the end thrust. In bearings of this kind, an extremely high degree of accuracy is required so as to insure a perfect contact between the conical surface of the roller and the two race rings as well as between the one end surface of the roller and the distance ring. To this end, the contact surface between the end of the roller and the distance ring must, if sufficiently produced, cut the conical surface of the roller along a circle having an exact predetermined diameter or, in other words, said contact surface shall lie at a predetermined distance from the imagined apex of the conical surface of the roller. By the present invention, rollers exactly fulfilling said condition can be manufactured.

In manufacturing the rollers, the conical surfaces are first ground, according to any known or suitable method through which the top angles are made exactly equal, and thereupon the larger end surface is ground by means of a rotary grinding disk having, preferably, a plane working surface. During this operation the rollers, according to the present invention, are supported by conical seats having the same conicity as the rollers, said conical seats having their axes parallel to the axis of the grinding disk and having their apices in a plane parallel to the working surface of the said disk. In thereupon grinding the smaller ends of the rollers, said rollers are placed, according to the invention, with their plane-ground larger end surfaces on a plane bed or bolster and with their conical surfaces bearing on conical seats in a holder, said conical seats having the same conicity as the rollers. In this manner, all the rollers being ground simultaneously will obtain exactly the same length, and it is thus possible to rapidly produce, at the same time, a great number of rollers of exact dimensions.

Figure 2:
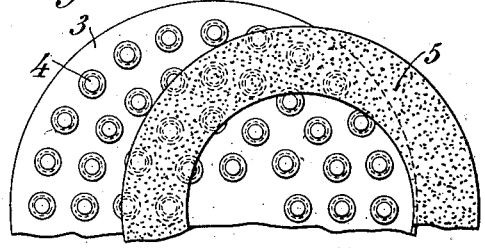
Figure 3:
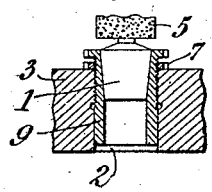
Figure 4:
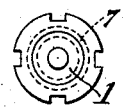
Figure 5:
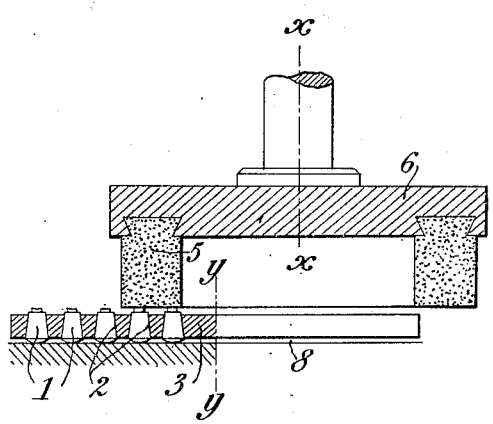
Figure 6:
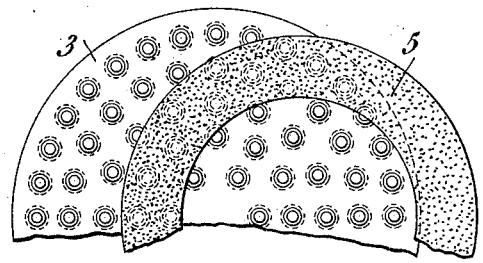

In the drawings is shown in substantially schematic manner, grinding mechanisms provided by the present invention for practising the method thus described. Figure 1 is a side elevation and partial section of a device for grinding the larger ends of the rollers. Fig. 2 is a plan view of the same device, the grinding disk being shown in section. Fig. 3 is a vertical section of a chuck serving as a supporting means for a roller during the grinding operation. Fig. 4 is a plan view of the chuck. Fig. 5 is a view, similar to that in Fig. 1, of a device for grinding the smaller ends of the rollers. Fig. 6 is a plan view of the same device, the grinding disk being shown in section.

The rollers 1 which are acted upon in the present method and by the apparatus, have their conical surfaces accurately finished so that the cones are of equal angles, and these rollers are held in position for the action of the grinder by means of conical seats or chucks suitably adapted for engaging conical surfaces with the apices of all the rollers located in a plane at a predetermined distance and parallel to the plane of action of the grinder.

Referring first to Figs. 1 and 2, the rollers 1 whose conical surfaces are finished, but whose end surfaces are still rough, are placed in downwardly tapering conical recesses or seats 2 in a support or holder 3. The rollers are held in such positions that their larger ends 4 project somewhat above the upper surface of the holder 3, the latter being, suitably, arranged to revolve about an axis $y$—$y$. The seats 2 are so arranged that their conical surfaces have their apices in one plane.

The grinding disk 5, which is, suitably, formed as a ring having a plane end surface, is shown placed in a holder 6 adapted to rotate with a suitable speed about an axis $x$—$x$ parallel to the axis $y$—$y$, said latter axis lying, preferably, eccentrically in relation to the former. The grinding disk, which, suitably, rotates with a greater speed than the roller support, should obviously have such a size that all the rollers are worked by the grinding disk during one revolution of the roller support.

The conical seats can be arranged either in the holder proper or in adjustable chucks, shown in the form of sleeves 9, Fig. 3, enabling the apices of the cones to be adjusted at a desired distance from the working surface of the grinding disk. The sleeve 9 is shown screwed into the holder 3 and secured by a locking nut 7.

In Figs. 5 and 6, the relative position of the roller support 3 and the grinding disk 5 is the same as in Figs. 1 and 2. The conical seats for the rollers, on the contrary, widen downwardly or in a direction away from the grinding disk. The rollers are placed in the holder with their smaller ends toward the grinding disk, while the larger ends bear on a plane bed 8, preferably a rotary magnetic chuck.

I claim as my invention:—

1. The method of manufacturing conical rollers which consists in forming the rollers to be operated upon of a uniform angularity, then positioning the rollers by means of their conical surfaces with their axes parallel and their conical apices in a common plane, then simultaneously grinding the larger ends of a plurality of said rollers with a rotary grinder having a grinding surface parallel to the apical plane of said rollers, thereby producing faces on the bases of the rollers of uniform distance from their apices.

2. The method of manufacturing conical rollers which consists in forming the rollers to be operated upon of a uniform angularity, then positioning the rollers by means of their conical surfaces with their axes parallel and their conical apices in a common plane, then simultaneously grinding the larger ends of a plurality of said rollers with a rotary grinder having a grinding surface parallel to the apical plane of said rollers, thereby producing faces on the bases of the rollers of uniform distance from their apices, then again positioning such rollers by means of their conical surfaces and the said uniform base faces so that such faces are disposed on a common plane parallel thereto and then simultaneously grinding the smaller ends of the rollers with a rotary grinder having a grinding surface parallel to the apical plane of said rollers, thereby producing rollers of uniform length.

3. The method of manufacturing conical rollers which consists in forming the rollers to be operated upon of uniform angularity, then positioning the rollers by means of their conical surfaces with their axes parallel and their conical apices in a common plane, and then simultaneously grinding the ends of a plurality of said rollers with a rotary grinder having a grinding surface parallel to the apical plane of such rollers, thereby producing end faces on the rollers of uniform distance from their apices.

4. The method of manufacturing conical rollers which consists in forming the rollers to be operated upon of uniform angularity, then positioning the rollers by means of their conical surfaces with their axes parallel and their conical apices in a common plane, and then successively grinding simultaneously the opposite ends of a plurality of said rollers with a rotary grinder having a grinding surface parallel to the apical plane of said rollers, thereby producing rollers of uniform length.

5. Apparatus for manufacturing conical rollers, comprising means for positioning such rollers of uniform angularity, such means engaging their conical surfaces and holding them with their axes parallel and their conical apices in a common plane, and a rotary grinder having a grinding surface parallel to the apical plane of said rollers operative to simultaneously grind the ends of a plurality of said rollers, thereby producing end faces on the rollers of uniform distance from their apices.

6. Apparatus for manufacturing conical rollers, comprising positioning means for receiving such rollers of uniform angularity, such means engaging their conical surfaces and holding them with their axes parallel and their conical apices in a common plane, and grinding means for grinding simultaneously the ends of a plurality of said rollers adapted to so grind successively the opposite ends of said rollers, said means consisting of a rotary grinder having a grinding surface parallel to the apical plane of said rollers, whereby to produce rollers of uniform length.

7. Apparatus for manufacturing conical rollers, comprising means for positioning such rollers of uniform angularity, such means engaging their conical surfaces and holding them with their axes parallel and their conical apices in a common plane, and a rotary grinder having a grinding surface parallel to the apical plane of said rollers adapted for simultaneously grinding the larger ends of a plurality of said rollers to produce faces on the bases of the rollers of uniform distance from their apices, positioning means adapted to engage such rollers by their conical surfaces and to engage the uniform base faces of the rollers so that such faces are disposed on a common plane parallel to said apical plane, whereby by simultaneously grinding the smaller ends of the rollers by such rotary grinder, they are ground to a surface parallel to said apical plane, thereby producing rollers of uniform length.

8. A device for grinding the end surfaces of conical rollers, consisting of a rotary grinding disk and a roller-supporting holder provided with chucks having uniform conical seats and adjustably mounted in the said roller-supporting holder, to enable the distance between the cone apices and the working surface of the grinding disk to be adjusted.

9. A device for grinding the end surfaces of conical rollers, consisting of a rotary grinding disk, a rotary roller-holding member having uniform conical seats tapering toward the said grinding disk, said conical seats having their axes parallel to the axis of the grinding disk and having their apices in a plane parallel to the working surface of the grinding disk, and a bed for supporting the rollers and pressing the same into the conical seats.

In testimony whereof I affix my signature.

BENGT WIKTOR FJELLMAN.